March 17, 1936.  E. E. HEWITT  2,034,295
FLUID PRESSURE BRAKE
Filed Feb. 27, 1931
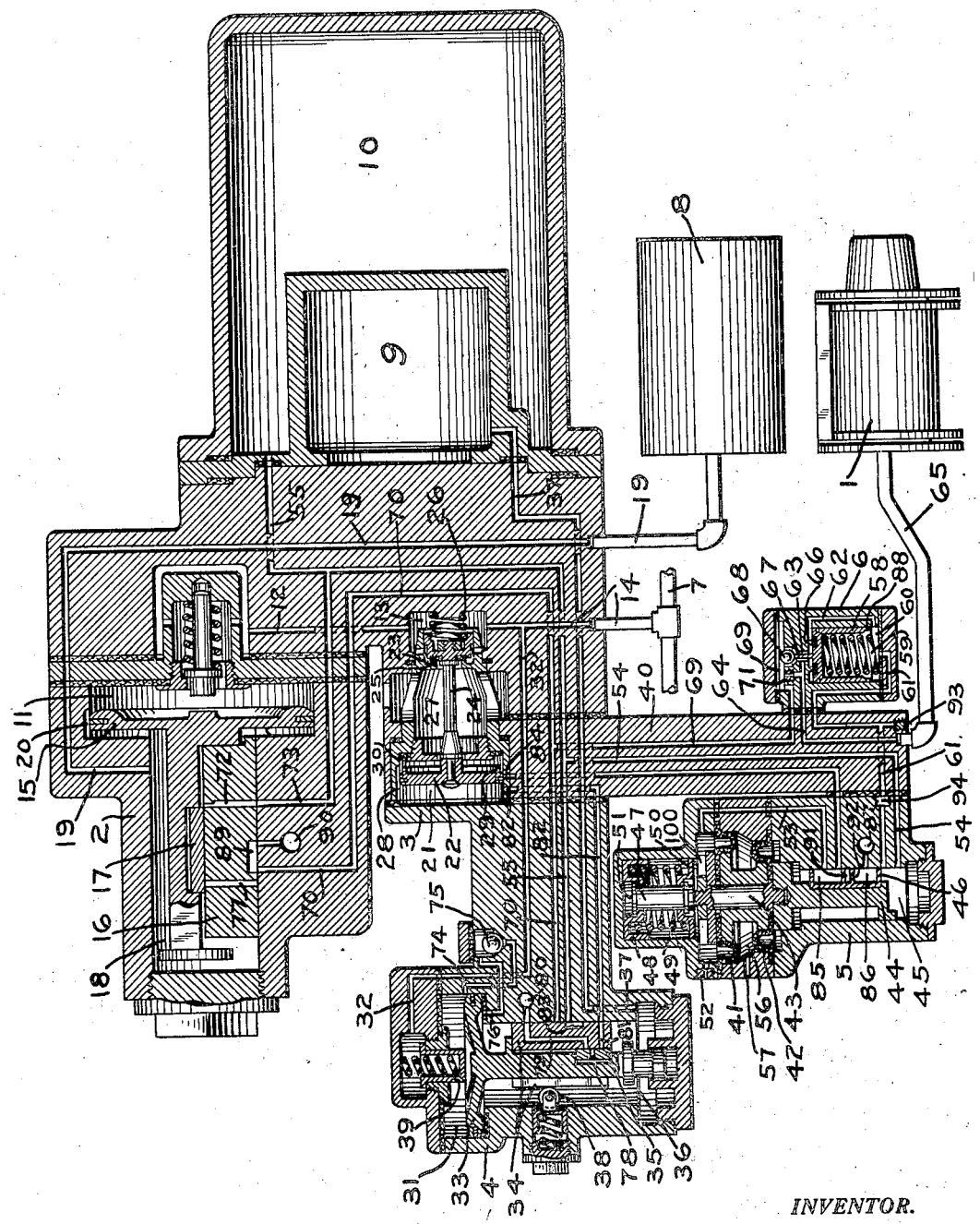
INVENTOR.
ELLIS E. HEWITT
By  Wm. M. Cady
ATTORNEY.

Patented Mar. 17, 1936

2,034,295

UNITED STATES PATENT OFFICE 2,034,295

FLUID PRESSURE BRAKE

Ellis E. Hewitt, Edgewood, Pa., assignor to The Westinghouse Air Brake Company, Wilmerding, Pa., a corporation of Pennsylvania Application February 27, 1931, Serial No. 518,695

40 Claims. (Cl. 303—46)

This invention relates to fluid pressure brakes and more particularly to a brake equipment which functions to control the rate of build up of brake cylinder pressure during an emergency application.

The principal object of my invention is to provide a fluid pressure brake equipment of the above type having improved means for varying the rate of brake cylinder pressure build up during an emergency application of the brakes.

According to the above object of my invention, I provide improved and simplified means for supplying an initial inshot of fluid under pressure to the brake cylinder of sufficient degree to move the brake cylinder piston outwardly so as to bring the brake shoes up against the car wheels, followed by a slow build up of brake cylinder pressure during a time interval of sufficient duration to permit the brakes to be gradually applied throughout the length of the train, so that while the brakes are applied throughout the train, the force of the brake application is not so heavy as to cause severe shocks, which would otherwise occur, due to the running in of the slack. After the above mentioned time interval has elapsed, my improved means operate to supply a final inshot of fluid under pressure to the brake cylinder at the normal unrestricted rate to quickly provide the desired high degree of brake cylinder pressure in an emergency application of the brakes.

Another object of my invention is to provide a fluid pressure brake equipment having means for varying the rate of build up in brake cylinder pressure during an emergency application of the brakes, which means is operable upon charging the equipment with fluid to a pressure exceeding that normally carried for preventing the variation in the rate of brake cylinder build up in effecting an emergency reduction in brake pipe pressure.

Other objects and advantages will appear in the following more detailed description of the invention.

In the accompanying drawing, the single figure is a diagrammatic sectional view of a brake equipment embodying my invention.

As shown in the drawing, the equipment may comprise a brake cylinder 1, a service application valve device 2, a quick action valve device 3, an emergency valve device 4, an emergency control valve device 5, an inshot valve device 6, a brake pipe 7, an auxiliary reservoir 8, a quick action reservoir 9 and an emergency reservoir 10.

The service application valve device 2 may comprise a casing, having a piston chamber 11 connected to the brake pipe 7 through a passage 12, a chamber 13 and a passage and pipe 14 and containing a piston 15 adapted to operate a main slide valve 16 and a graduating slide valve 17 contained in a chamber 18 which is connected to the auxiliary reservoir 8 through a passage and pipe 19. With the piston in release position, as shown in the drawing, the piston chamber 11 is connected to the valve chamber 18 through a feed groove 20. Also provided in the casing are the quick action reservoir 9 and the emergency reservoir 10.

The quick action valve device 3 comprises a casing which may be integral with the casing of the service application valve device 2 and has a piston chamber 21 containing a quick action piston 22 to which a brake pipe vent valve 23, contained in the chamber 13, is operatively connected through the medium of a stem 24. The vent valve 23 is normally held seated on an annular seat rib 25 by the pressure of a spring 26 and is operated by the quick action piston to establish communication from the brake pipe to a chamber 27 open to the atmosphere. Normally, the piston chamber 21 is connected to the chamber 27 through a leakage groove 28 around the quick action piston, said piston having an annular rib 29 which is adapted to seat on a gasket 30 and form an air-tight seal between the chambers 21 and 27.

The emergency valve device may comprise a casing having a piston chamber 31 connected to the brake pipe 7, through a passage 32 and passage and pipe 14 and containing a piston 33 which is adapted to operate a slide valve 34 and an auxiliary slide valve 35 contained in a valve chamber 36 connected to the quick action reservoir 9 through a passage 37. The slide valve 34 is pressed against its seat by a spring-pressed roller 38 which engages the back of the slide valve. A spring-pressed stop 39 is provided in the casing and functions to define service position of the emergency piston 33.

The emergency control valve device 5 may comprise a casing which is mounted on a pipe bracket 40 clamped between the casings of the application valve device 2 and the emergency valve device 4. The valve device 5 also comprises spaced diaphragms 41 and 42 which are mounted in the casing, the diaphragm 41 having a greater area than that of the diaphragm 42. A stem 43 is secured to both diaphragms 41 and 42 and at one end has screw-threaded connection with a stem extension 44 contained in a chamber 45 at one side of the diaphragm 42, which extension is adapted to operate a slide valve 46 also contained in the chamber 45.

Contained in a chamber 100 at one side of the flexible diaphragm 41 is a stop member 47 which is mounted in a member 48 rigidly attached to the casing. This stop member is movable in the direction of its length and is subject to the pressure of a spring 49, which pressure is transmitted to the member 47 through the medium of a follower plate 50. Inward movement of the member 47 is limited by a head 51 on one end of the member engaging the member 48. The other end of the stop member 47 is adapted to be engaged by the outer end of the diaphragm stem 43 and prevents the stem 47 and parts connected thereto from moving outwardly beyond the position in which they are shown in the drawing when the equipment is charged with fluid to the pressure normally carried for low speed service, say for instance, to seventy pounds. The spring 49 is such a value that when the equipment is charged with fluid at a pressure normally carried for high speed service, say for instance, above eighty pounds, the stem 47 will be moved upwardly against the opposing pressure of the spring, all of which will hereinafter be more fully described.

The diaphragm chamber 100 of the control valve device 5 is open to the atmosphere through a choke plug 52 and has a passage 53 which leads to the seat of the slide valve 46. The chamber 45 is connected to the emergency reservoir through passages 54 and 55. Between the diaphragms 41 and 42 there is a chamber 56 which is open to the atmosphere through a port 57.

The inshot valve device 6 comprises a casing which is mounted on the pipe bracket 40 and also comprises a valve piston 58 which is operatively mounted in the casing. The valve piston is subject on one side to the pressure of a coil spring 59 contained in a chamber 60 which is connected through a passage 61 to the seat of the slide valve 46 of the control valve device 5. Leading from the outer seated area of the valve piston to the chamber 60 is a passage 62. The inner seated area of the valve piston is connected to the brake cylinder 1 through a passage 63, a passage 64 and a pipe 65. With the valve piston maintained seated on an annular seat rib 66, a projection 67 extending outwardly from the inner seated area of the valve piston maintains a ball valve 68, interposed in the passage 63, unseated so that the brake cylinder and inner seated area of the valve piston are connected to the seat of the application slide valve 16 and to the seat of the emergency slide valve 34 through passage 63, past the unseated ball valve 68, through passage 69 and passage 70. The brake cylinder passage is also connected with the passage 69 through a choke plug 71.

In operation, fluid under pressure from the brake pipe 7 flows to the piston chamber 11 of the application valve device by way of pipe and passage 14, vent valve chamber 13 and passage 12, forcing the application piston 15 to its innermost position. From the piston chamber 11 fluid under pressure now flows through the feed groove 20 to the valve chamber 18 and from this chamber flows through passage and pipe 19 to the auxiliary reservoir 8. Fluid under pressure from the valve chamber 18 also flows to the emergency reservoir 10 through a restricted port 72 in the main slide valve 16, a passage 73 and passage 55, the port 72 having been uncovered by the graduating slide valve 17 upon the initial movement of the piston 15 toward its innermost position.

Fluid under pressure from the brake pipe passage 14 is also supplied through the passage 32 to the emergency piston chamber 31 where it acts to force the emergency piston 33 to its innermost position. With the piston 33 in this position, fluid from the piston chamber is supplied to the emergency valve chamber 36 through a passage 74, past a ball check valve 75 and through a passage 76. From the chamber 36 fluid under pressure flows through the passage 37 to the quick action chamber 9, thus charging the quick action chamber.

Fluid under pressure supplied from the valve chamber 18 in the application valve device 2 to the passage 55, besides flowing to the emergency reservoir, also flows through passage 54 to the chamber 45 in the emergency controlling valve device 5, where it acts on the flexible diaphragm 42 to force the diaphragm stem 43 into engagement with the spring-pressed stop member 47. The pressure of the spring 49 is sufficient to cause the stem 43 to be brought to a stop in the position shown in the drawing.

From the control valve chamber 45 fluid under pressure flows through passage 61 to the chamber 60 at the spring side of the valve piston 58 of the inshot valve device and with the valve piston in its upper seated position, as shown in the drawing, fluid flows through the passage 62 from the chamber 60 to the outer seated area of the valve piston.

When it is desired to effect a service application of the brakes, the pressure in the brake pipe 7, and consequently in the piston chamber 11 of the application valve device 2, is reduced in the usual manner. The reduction of pressure in the application piston chamber 11 causes the application piston 15 and consequently the slide valves 16 and 17 to be shifted to service position. With these slide valves in this position, the usual service port 77 in the main slide valve 16 is uncovered and registers with the passage 70 so as to supply fluid under pressure from the valve chamber 18 and auxiliary reservoir 8 to the brake cylinder 1 by way of port 77, passage 70, passage 69, past the unseated ball valve 68, passage 63, passage 64 and pipe 65.

The reduction of pressure in the brake pipe 7, at a service rate, causes the piston 33 of the emergency valve device 4, to be shifted outwardly until it engages the spring-pressed stop 39. The piston, as it is thus moved, shifts the auxiliary slide valve 35 to a position in which the valve chamber 36 and consequently the quick action reservoir 9 are connected to the atmosphere by way of a port 78 in the slide valve 35, a port 79 in the slide valve 34, and an atmospheric exhaust port 80.

When the pressure of fluid in the valve chamber 36 and the connected quick action reservoir 9 has been reduced slightly below the pressure in the brake pipe 7 and emergency piston chamber 31, the higher pressure acting on the outer face of the piston 33 will shift said piston to its innermost position, with a consequent movement of the slide valve 35 to release position, thereby preventing an emergency application of the brakes.

In effecting a service application of the brakes, the emergency controlling valve device 5 does not operate, so that emergency reservoir pressure in chamber 60 of the inshot valve device 6 maintains the valve piston 58 in its upper seated position against the opposing brake cylinder pressure acting on the inner seated area of the valve piston, in which position the projection 67 maintains the ball valve 68 unseated.

It will thus be seen that in effecting a service application of the brakes, the inshot valve device will not be caused to operate to restrict the flow of fluid to the brake cylinder.

When an emergency application of the brakes is initiated by effecting a sudden reduction of pressure in the brake pipe 7 and consequently in the piston chamber 11 of the application valve device 2 and in the piston chamber 31 of the emergency valve device 4, the higher pressure in valve chambers 18 and 36, acting on the opposite side of respective pistons 15 and 33, will shift said pistons to their extreme outer or emergency position.

The piston 33 in moving to emergency position, first shifts the auxiliary slide valve 35 relative to the slide valve 34 and uncovers the port 81 in the slide valve 34 so that the valve chamber 36 and consequently the quick action reservoir 9, is connected to the quick action piston chamber 21, and then shifts both slide valves to emergency position, in which the slide valve 34 uncovers the passage 82. The fluid under pressure so supplied from the quick action reservoir 9 to the piston chamber 21, acts to shift the quick action piston 22 so as to unseat the vent valve 23 and vent fluid from the valve chamber 13 and brake pipe 7 to the atmosphere by way of chamber 27, which is open to atmosphere, thereby causing quick serial venting of the brake pipe throughout the train. With the quick action piston 22 in its innermost position, the annular rib 29 on the inner face of the piston seats on the gasket 30 and forms an air-tight seal, thus preventing leakage of fluid under pressure from the chamber 21 to the atmosphere.

With the slide valve 34 of the emergency valve device 4 in emergency position, a cavity 83 in this slide valve connects the passage 55, leading from the emergency reservoir 10, to the passage 70 which, with the application valve device in application position, is connected with the auxiliary reservoir 8, so that fluid under pressure from both reservoirs is supplied to the brake cylinder 1 by way of passage 70, passage 69, past the unseated ball valve 68, passages 63 and 64 and pipe 65. Pressure of fluid from both reservoirs is also present in the valve chamber 45 of the emergency controlling valve device.

The quick action piston 22 in moving inwardly to unseat the vent valve 23, uncovers a passage 84, so that fluid under pressure supplied from the quick action reservoir 9 to the piston chamber 21 flows to the diaphragm chamber 100 of the emergency controlling valve device 5 by way of the passage 84, a cavity 85 in the slide valve 46 and passage 53. Fluid under pressure is vented from the chamber by way of the choke plug 52 at a slower rate than it is being supplied from the quick action reservoir, so that there will be a build up of pressure in the chamber 100.

At the same time as the pressure of fluid in the chamber 100 is thus being built up, the pressure of fluid in the valve chamber 45 is reducing, due to the flow of fluid from the emergency reservoir 10 and auxiliary reservoir 8 to the brake cylinder 1. Now when the pressure of fluid in the chamber 100 and acting on the large diaphragm 41 is built up to a predetermined degree, say for instance thirty pounds, under the pressure of fluid in the chamber 45 and acting on the small diaphragm 42, the pressure of fluid in the chamber 100 will cause the diaphragms 41 and 42, stem 43 and stem extension 44 to move downwardly, shifting the slide valve 46 to emergency position. With the slide valve 46 in this position, the chamber 60 at the spring side of the valve piston 58 of the inshot valve device 6 is vented to the atmosphere by way of passage 61, a cavity 86 in the slide valve 46 and an atmospheric exhaust port 87, and the cavity 85 maintains the passages 53 and 84 connected, so that fluid under pressure from the quick action reservoir 9 continues to flow to the diaphragm chamber 100 of the control valve device 5.

With the chamber 60 of the inshot valve device thus vented, the pressure of the spring 59 maintains the valve piston 58 in its upper seated position, as shown in the drawing, and fluid under pressure continues to flow past the ball valve 68 to the brake cylinder until such time as the brake cylinder pressure is built up to a predetermined degree, say for instance 15 pounds. Now when the pressure of fluid thus supplied to the brake cylinder and acting on the inner seated area of the valve piston is sufficient to overcome the opposing pressure of the spring 59, the valve piston will be caused to move downwardly, unseating the valve piston from the seat rib 66 and seating the valve 88 at the lower end of the valve piston.

When the valve piston is thus moved, the ball valve 68, due to the force of gravity, seats and closes the unrestricted communication from the passage 69 to the passage 63. With the ball valve 68 seated, fluid under pressure supplied to the passage 69 from the auxiliary reservoir 8 and emergency reservoir 10 flows to the brake cylinder at a restricted rate through the choke plug 71, passage 64 and pipe 65.

At the same time as fluid under pressure is being supplied to the brake cylinder, the pressure of fluid supplied from the quick action reservoir 9 to the diaphragm chamber 100 of the control valve device 5 is being vented to the atmosphere through the choke plug 52. Now when the pressure of fluid in the chamber 100 acting on one side of the large diaphragm 41 is reduced sufficiently that the pressure of fluid in the chamber 45 acting on one side of the small diaphragm 42 is sufficient to overcome the opposing pressure in chamber 100, the diaphragms 41 and 42, stem 43, stem extension 44 and slide valve 46 will be returned to normal position, as shown in the drawing. It will here be noted that the choke plug 52 so controls the flow of fluid from the chamber 100 to the atmosphere that the diaphragms 41 and 42 and associated parts will remain in their lowermost position until a predetermined period of time has elapsed, for instance fifteen seconds, after the ball valve 68 is seated.

When the slide valve is returned to its normal position, fluid under pressure from the valve chamber 45, as supplied from the auxiliary reservoir 8 and emergency reservoir, flows through passage 61 to the chamber 60 at the spring side of the valve piston 58. The pressure of fluid thus supplied to the chamber 60 being considerably higher than brake cylinder pressure acting on the opposite side of the valve piston, causes the valve piston to return to its upper seated position, unseating the ball valve 68, so that fluid under pressure is now permitted to flow to the brake cylinder at the normal rate for the remainder of the emergency application.

When the brake pipe has been completely vented to the atmosphere, the pressure of fluid in the quick action piston chamber 21 as supplied from the quick action reservoir 9 will have been reduced sufficiently that the pressure of the spring 26 of the vent valve device will cause the vent valve 23 to seat and close communication from the brake pipe to the atmosphere and at the same time cause the quick action piston 22 to move to its outermost position, as shown in the drawing. With the piston 22 thus returned to its normal position, communication between the piston chamber 21 and the diaphragm chamber 100 of the control valve device 5 is closed.

When it is desired to release the brakes after an emergency application has been effected, the brake pipe pressure is increased in the usual way, which consequently increases the pressure of fluid in piston chambers 11 and 31 of the valve devices 2 and 4 respectively, so that the pistons 15 and 33 of said valve devices are shifted to their innermost or release positions. The shifting of the pistons 15 and 33 to their release positions acts to move the respective slide valves 16 and 17, and 34 and 35, to release position.

With the slide valves 16 and 17 of the application valve device 2 in release position, fluid under pressure is released from the brake cylinder 1 by way of pipe 65, passages 64 and 63, past the ball valve 68, passages 69 and 70, a cavity 89 in the slide valve 16 and atmospheric exhaust port 90.

With each of the several devices of the equipment in release position, the equipment is recharged in the same manner as described in connection with the initial charging.

When, in operating a train in high speed service or on a steep descending grade, it is desired to render the control valve device 5 and inshot valve device 6 ineffective to vary the rate of flow of fluid to the brake cylinder in effecting an emergency application of the brakes, the brake pipe pressure is increased above that normally carried. Now when the pressure of fluid supplied from the brake pipe to the emergency reservoir is increased to a predetermined degree above the pressure normally carried in the reservoir, say to a pressure above eighty pounds, emergency reservoir pressure present in the valve chamber 45 of the control valve device 5, acting on one side of the small diaphragm 42, causes the diaphragms 41 and 42, stem 43, stem extension 44 and slide valve 46 to shift upwardly against the opposing pressure of the spring-pressed stop 47 from their normal position as shown in the drawing to emergency cut-out position. With the slide valve in emergency cut-out position, communication from the passage 84 to the passage 53 is closed and communication from the passage 84 to the atmospheric exhaust passage is established by way of a cavity 91 in the slide valve 46, a restricted port 92 and the cavity 86.

Now when the brake pipe is reduced at an emergency rate to effect an application of the brakes, the application valve device 2 will operate to application position and the emergency valve device 4 will operate to emergency position, so that fluid under pressure is supplied to the brake cylinder from the auxiliary reservoir 8 and emergency reservoir 10, past the unseated ball valve 68 of the inshot valve device 6. With the emergency valve device 4 in emergency position, fluid under pressure is supplied from the quick action reservoir 9 to the quick action piston chamber 21 in the same manner as before described, causing the piston 22 to operate to unseat the vent valve 23 and vent fluid under pressure from the brake pipe to the atmosphere as before described. As the piston is thus shifted, it uncovers the passage 84 and fluid under pressure supplied to the piston chamber 21 from the quick action reservoir 9 flows to the atmosphere by way of passage 84, cavity 91 in the slide valve 46, port 92, cavity 86 and atmospheric exhaust port 87.

Since the passage 61 remains connected with the valve chamber 45 of the control valve device 5, the pressure of fluid supplied from the chamber 45 to the chamber 60 by way of passage 61 will maintain the valve piston 58 in its upper seated position as shown in the drawing, so that the flow of fluid to the brake cylinder will not be restricted at any time during the application of the brakes.

In some cases it may be that the final inshot of fluid under pressure to the brake cylinder in effecting an emergency application of the brakes is not desired. In such cases, a plug 93, which is mounted in the pipe bracket 40 and closes the passage 61 against communication with the atmosphere, is removed and a similar plug is inserted in a recess 94 to close communication through the passage 61 from the valve chamber 45 of the control valve device 5 to the atmosphere by way of that portion of the passage which has been opened to the atmosphere by the removal of the plug 93.

With the plug 93 removed, the chamber 60 at the spring side of the inshot valve piston 58 is open to the atmosphere through the passage 61, so that the unseating of the valve piston is resisted at all times by the pressure of the spring 59 only. In effecting an emergency application of the brakes, the application valve device 2, emergency valve device 4, emergency valve device 5 and quick action valve device 3 will operate to their emergency positions, as before described, and the ball valve 68 of the inshot valve device is maintained unseated by the valve piston 58. A quick inshot of fluid under pressure is supplied to the brake cylinder past the unseated ball valve 68 and when a predetermined pressure is obtained in the brake cylinder, due to such inshot of fluid, the pressure of fluid flowing to the brake cylinder and acting on the inner seated area of the valve piston causes the valve piston to move downwardly to its lower seated position, permitting the ball valve 68 to seat. With the ball valve 68 thus seated, the supply of fluid under pressure to the brake cylinder will be at a restricted rate through the choke plug 71. It will thus be seen that when an emergency application of the brakes is initiated there will be an initial quick inshot of fluid pressure to the brake cylinder and then the rate of brake cylinder build up will be slowed up for the remainder of the brake application.

From the foregoing description it will be seen that I have provided a fluid pressure brake equipment having a valve mechanism which will, upon a sudden reduction in brake pipe pressure, first permit fluid under pressure to flow to the brake cylinder at a relatively fast rate until such time as a predetermined pressure is attained in the brake cylinder and then operate to retard the rate of flow for a predetermined period of time and finally, after said period of time has elapsed, operates to permit fluid under pressure to again flow to the brake cylinder at a fast rate. It will also be seen that by charging the equipment to a pressure higher than normally carried, for instance from seventy pounds to eighty pounds, the valve mechanism is rendered ineffective to vary the rate of flow of fluid to the brake cylinder in effecting an application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a brake cylinder, of valve means operated upon a sudden reduction in brake pipe pressure for supplying fluid under pressure to the brake cylinder, said valve means comprising an application valve device and an emergency valve device, a valve device operative to govern the rate of flow of fluid supplied by both the application valve device and the emergency valve device to the brake cylinder, and a valve mechanism operated upon the operation of said emergency valve device for controlling the operation of said valve device.

2. In a fluid pressure brake, the combination with a brake pipe and a brake cylinder, of valve means operative to vary the rate of flow of fluid to the brake cylinder in effecting an emergency application of the brakes, a valve device operative to control the operation of said valve means, and a plurality of valve devices operated upon a sudden reduction in brake pipe pressure for supplying fluid under pressure to the brake cylinder to effect an emergency application of the brakes and for supplying fluid under pressure to said valve device to initiate the operation of the valve device to control the operation of said valve means.

3. In a fluid pressure brake, the combination with a brake pipe, a brake cylinder, an auxiliary reservoir, an emergency reservoir and a quick action reservoir, each of said reservoirs being normally charged with fluid under pressure, of valve means operative to govern the rate of flow of fluid to the brake cylinder in effecting an application of the brakes, a valve device for controlling the operation of said valve means, an application valve device operated upon a sudden reduction in brake pipe pressure for establishing communication through which fluid under pressure is supplied from the auxiliary reservoir to the brake cylinder, and an emergency valve device operated upon said sudden reduction in brake pipe pressure for establishing communication through which fluid under pressure is supplied from the emergency reservoir to the brake cylinder and for also establishing communication through which fluid under pressure is supplied from said quick action reservoir to said valve device to control the operation of the valve device.

4. In a fluid pressure brake, the combination with a brake pipe, a brake cylinder, an auxiliary reservoir, an emergency reservoir and a quick action reservoir, each of said reservoirs being normally charged with fluid under pressure, of valve means operative to govern the rate of flow of fluid to the brake cylinder in effecting an application of the brakes, a valve device for controlling the operation of said valve means, an application valve device operated upon a sudden reduction in brake pipe pressure for establishing communication through which fluid under pressure is supplied from the auxiliary reservoir to the brake cylinder, an emergency valve device operated upon said sudden reduction in brake pipe pressure for establishing communication through which fluid under pressure is supplied from the emergency reservoir to the brake cylinder and for also establishing communication through which fluid under pressure is supplied from the quick action reservoir to said valve device to control the operation of the valve device, and means for gradually venting fluid under pressure supplied from the quick action reservoir to said valve device.

5. In a fluid pressure brake, the combination with a brake pipe, a brake cylinder, an auxiliary reservoir, an emergency reservoir and a quick action reservoir, each of said reservoirs being normally charged with fluid under pressure, of valve means operative to govern the rate of flow of fluid to the brake cylinder in effecting an application of the brakes, a valve device for controlling the operation of said valve means, an application valve device operated upon a sudden reduction in brake pipe pressure for establishing communication through which fluid under pressure is supplied from the auxiliary reservoir to the brake cylinder, an emergency valve device operated upon said sudden reduction in brake pipe pressure for establishing communication through which fluid under pressure is supplied from the emergency reservoir to the brake cylinder and for also establishing communication through which fluid under pressure is supplied from the quick action reservoir to said valve device to control the operation of the valve device, and means for venting, at a predetermined restricted rate, fluid under pressure supplied from the quick action reservoir to said valve device.

6. In a fluid pressure brake, the combination with a brake pipe, a brake cylinder, a normally charged emergency reservoir, another normally charged reservoir, of a valve device operative to vary the rate of flow of fluid to the brake cylinder in effecting an application of the brakes, a valve means operative to control the operation of said valve device, said valve means being subject on one side to emergency reservoir pressure and having a normal position for supplying fluid under pressure to said valve device, a controlling position in which fluid under pressure is vented from said valve device, and a final controlling position in which fluid under pressure is again supplied to said valve device, an emergency valve device operated upon a sudden reduction in brake pipe pressure for establishing communication through which fluid under pressure is supplied from the emergency reservoir to the brake cylinder and for also establishing communication through which fluid under pressure is supplied from said other reservoir to said valve means to cause said valve means to move to the first mentioned controlling position against the opposing emergency reservoir pressure, said valve device being operated by fluid under pressure being supplied to the brake cylinder when said valve means is in the first mentioned controlling position and the brake cylinder is increased to a predetermined degree, and means for reducing the pressure of fluid supplied from said other reservoir to the valve means at a predetermined rate to cause said valve means to operate to again supply fluid under pressure to said valve device for controlling the operation of the valve device to increase the rate of flow of fluid to the brake cylinder.

7. In a fluid pressure brake, the combination with a brake pipe, and a brake cylinder, of two normally charged reservoirs, of a valve mechanism operative to vary the rate of flow of fluid under pressure to the brake cylinder in effecting an application of the brakes, valve means subject to the opposing pressures of said reservoirs for controlling the operation of said valve mechanism, and an emergency valve device operated upon a sudden reduction in brake pipe pressure for establishing communication through which fluid under pressure is supplied from one of said reservoirs to the brake cylinder and for establishing communication through which fluid under pressure is supplied from the other of said reservoirs to said valve means.

8. In a fluid pressure brake, the combination with a brake pipe, and a brake cylinder, of two normally charged reservoirs, of a valve mechanism operative to vary the rate of flow of fluid under pressure to the brake cylinder in effecting an application of the brakes, valve means subject to the opposing pressures of said reservoirs for controlling the operation of said valve mechanism, an emergency valve device operated upon a sudden reduction in brake pipe pressure for establishing communication through which fluid under pressure is supplied from one of said reservoirs to the brake cylinder and for establishing communication through which fluid under pressure is supplied from the other of said reservoirs to said valve means, and means for venting, at a predetermined rate, fluid supplied from said other reservoir to said valve means.

9. In a fluid pressure brake, the combination with a brake pipe, a brake cylinder, and two reservoirs normally charged with fluid under pressure, of valve means operative to vary the rate of flow of fluid under pressure to the brake cylinder in effecting an application of the brakes, valve mechanism subject to the opposing pressures of said reservoirs for controlling the operation of said valve means, and a valve device operated upon a sudden reduction in brake pipe pressure for establishing communication through which fluid under pressure is supplied from one of said reservoirs to the brake cylinder to effect an application of the brakes, and for establishing another communication through which fluid under pressure is supplied from the other of said reservoirs to said valve mechanism for initiating the operation of the valve mechanism to control said valve means.

10. In a fluid pressure brake, the combination with a brake pipe, a brake cylinder, and two reservoirs normally charged with fluid under pressure, of valve means operative to vary the rate of flow of fluid under pressure to the brake cylinder in effecting an application of the brakes, valve mechanism subject to the opposing pressures of said reservoirs for controlling the operation of said valve means, a valve device operated upon a sudden reduction in brake pipe pressure for establishing communication through which fluid under pressure is supplied from one of said reservoirs to the brake cylinder to effect an application of the brakes, and for establishing another communication through which fluid under pressure is supplied from the other of said reservoirs to said valve mechanism for initiating the operation of the valve mechanism to control said valve means, and means reducing the pressure of fluid supplied from said other reservoir to the valve mechanism to control the final operation of the valve mechanism.

11. In a fluid pressure brake, the combination with a brake pipe, a brake cylinder, and two reservoirs normally charged with fluid under pressure, of valve means operative to vary the rate of flow of fluid under pressure to the brake cylinder in effecting an application of the brakes, valve mechanism subject to the opposing pressures of said reservoirs for controlling the operation of said valve means, a valve device operated upon a sudden reduction in brake pipe pressure for establishing communication through which fluid under pressure is supplied from one of said reservoirs to the brake cylinder to effect an application of the brakes, and for establishing another communication through which fluid under pressure is supplied from the other of said reservoirs to said valve mechanism for initiating the operation of the valve mechanism to control said valve means, and means for timing the control operation of said valve mechanism.

12. In a fluid pressure brake, the combination with a brake pipe, a brake cylinder, and two reservoirs normally charged with fluid under pressure, of a valve device operative to vent fluid under pressure from the brake pipe, valve means operative to vary the rate of flow of fluid under pressure to the brake cylinder, valve mechanism operative to control the operation of said valve means, and an emergency valve device operated upon a sudden reduction in brake pipe pressure for establishing communication through which fluid under pressure is supplied from one of said reservoirs to said brake cylinder to effect an application of the brakes and for also establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism.

13. In a fluid pressure brake, the combination with a brake pipe, a brake cylinder, and two reservoirs normally charged with fluid under pressure, of a valve device operative to vent fluid under pressure from the brake pipe, valve means operative to vary the rate of flow of fluid under pressure to the brake cylinder, valve mechanism operative to control the operation of said valve means, an emergency valve device operated upon a sudden reduction in brake pipe pressure for establishing communication through which fluid under pressure is supplied from one of said reservoirs to said brake cylinder to effect an application of the brakes and for also establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism, and means for timing the controlling action of said valve mechanism.

14. In a fluid pressure brake, the combination with a brake pipe, a brake cylinder, and two reservoirs normally charged with fluid under pressure, of a valve device operative to vent fluid under pressure from the brake pipe, valve means operative to vary the rate of flow of fluid under pressure to the brake cylinder, valve mechanism operative to control the operation of said valve means, an emergency valve device operated upon a sudden reduction in brake pipe pressure for establishing communication through which fluid under pressure is supplied from one of said reservoirs to said brake cylinder to effect an application of the brakes and for also establishing communication through which fluid under pressure is supplied from the other of said reservoirs to said valve device to cause the valve device to operate to vent fluid under pressure from the brake pipe to the atmosphere, said valve device in venting position establishing communication through which fluid under pressure flowing thereto from said other reservoir is supplied to said valve mechanism to initiate the controlling operation of the valve mechanism, and means venting fluid under pressure from said other reservoir at a restricted rate for timing the action of said valve mechanism and for permitting said valve device to operate to close communication from the brake pipe to the atmosphere and to close communication from said other reservoir to the valve mechanism.

15. In a fluid pressure brake equipment, the combination with a brake pipe and a brake cylinder, of valve means operated upon a sudden reduction in brake pipe pressure for establishing communication through which fluid under pressure is supplied to the brake cylinder, and valve mechanism operable upon the operation of said valve means to effect an application of the brakes, and when the equipment is charged with fluid at a predetermined pressure, for varying the rate of flow of fluid to the brake cylinder, said valve mechanism being rendered ineffective to vary the rate of flow of fluid to the brake cylinder when the equipment is charged to a pressure higher than said predetermined pressure and when the valve means is operated to effect an application of the brakes.

16. In a fluid pressure brake equipment, the combination with a brake pipe and a brake cylinder, of valve means operated upon a sudden reduction in brake pipe pressure for establishing communication through which fluid under pressure is supplied to the brake cylinder, valve mechanism having a position establishing communication through which fluid under pressure supplied by said valve means flows to the brake cylinder at a fast rate and having another position in which the rate of flow of fluid to the brake cylinder is retarded, a valve device operative upon the operation of said valve means to effect an application of the brakes for controlling the operation of said valve mechanism to vary the rate of flow of fluid to the brake cylinder when the equipment is charged to said predetermined pressure, said valve device being shifted upon the charging of the equipment to a pressure higher than said predetermined pressure to a position for rendering said valve mechanism ineffective to vary the rate of flow of fluid under pressure to the brake cylinder.

17. In a fluid pressure brake equipment, the combination with a brake pipe, a brake cylinder, and two reservoirs normally charged with fluid under pressure, valve means normally subject on one side to the pressure of fluid from one of said reservoirs and operative to vary the rate of flow of fluid to the brake cylinder in effecting an application of the brakes, a valve device subject on one side to the pressure of fluid from said reservoir and operative when subjected to the pressure of fluid from the other of said reservoirs for controlling the operation of said valve means, and an emergency valve device operated upon a reduction in brake pipe pressure for supplying fluid under pressure from the first mentioned reservoir to the brake cylinder to effect an application of the brakes, and for supplying fluid under pressure from said other reservoir to said valve device to cause the valve device to operate to control the operation of said valve means.

18. In a fluid pressure brake equipment, the combination with a brake pipe, a brake cylinder, and two reservoirs normally charged with fluid under pressure, valve means normally subject on one side to the pressure of fluid from one of said reservoirs and operative to vary the rate of flow of fluid to the brake cylinder in effecting an application of the brakes, a valve device subject on one side to the pressure of fluid from said reservoir and operative when subjected to the pressure of fluid from the other of said reservoirs for controlling the operation of said valve means, and an emergency valve device operated upon a reduction in brake pipe pressure for supplying fluid under pressure from the first mentioned reservoir to the brake cylinder to effect an application of the brakes, and for supplying fluid under pressure from said other reservoir to said valve device to cause the valve device to operate to control the operation of said valve means, said valve device being operable upon an increase in the pressure of fluid in one of said reservoirs above that normally carried for rendering said valve means ineffective to vary the rate of flow of fluid to the brake cylinder.

19. In a fluid pressure brake equipment, the combination with a brake pipe, a brake cylinder, and two reservoirs normally charged with fluid under pressure, valve means normally subject on one side to the pressure of fluid from one of said reservoirs and operative to vary the rate of flow of fluid to the brake cylinder in effecting an application of the brakes, a valve device subject on one side to the pressure of fluid from said reservoir and operative when subjected to the pressure of fluid from the other of said reservoirs for controlling the operation of said valve means, an emergency valve device operated upon a reduction in brake pipe pressure for supplying fluid under pressure from the first mentioned reservoir to the brake cylinder to effect an application of the brakes, and for supplying fluid under pressure from said other reservoir to said valve device to cause the valve device to operate to control the operation of said valve means, and means for returning said valve device to its normal controlling position upon the pressure of fluid in the last mentioned reservoir being reduced to that normally carried.

20. In a fluid pressure brake, the combination with a brake pipe, a brake cylinder, an emergency reservoir and a quick action reservoir, a valve device operative to vary the rate of flow of fluid under pressure to the brake cylinder in effecting an application of the brakes, valve means subject to the pressure of fluid from the emergency reservoir and adapted to be operated by fluid under pressure from said quick action reservoir to control the operation of said valve device, a quick action valve device adapted to be operated by fluid under pressure from said quick action reservoir for venting fluid under pressure from the brake pipe to the atmosphere, and valve mechanism operated upon a sudden reduction in brake pipe pressure for supplying fluid under pressure from said emergency reservoir to the brake cylinder and for supplying fluid under pressure from the quick action reservoir to said quick action valve device and valve means.

21. In a fluid pressure brake, the combination with a brake pipe, a brake cylinder, an emergency reservoir and a quick action reservoir, a valve device operative to vary the rate of flow of fluid under pressure to the brake cylinder in effecting an application of the brakes, valve means subject to the pressure of fluid from the emergency reservoir and adapted to be operated by fluid under pressure from said quick action reservoir to control the operation of said valve device, a quick action valve device adapted to be operated by fluid under pressure from said quick action reservoir for venting fluid under pressure from the brake pipe to the atmosphere, and valve mechanism operated upon a sudden reduction in brake pipe pressure for supplying fluid under pressure from said emergency reservoir to the brake cylinder and for supplying fluid under pressure from the quick action reservoir to said quick action valve device and valve means, said valve means being operated, when the emergency reservoir pressure is increased to a predetermined degree beyond that normally carried, to a position for rendering said valve device ineffective to vary the rate of flow of fluid to the brake cylinder in effecting an application of the brakes.

22. In a fluid pressure brake, the combination with a brake pipe, a brake cylinder, an emergency reservoir and a quick action reservoir, a valve device operative to vary the rate of flow of fluid under pressure to the brake cylinder in effecting an application of the brakes, valve means subject to the pressure of fluid from the emergency reservoir and adapted to be operated by fluid under pressure from said quick action reservoir to control the operation of said valve device, a quick action valve device adapted to be operated by fluid under pressure from said quick action reservoir for venting fluid under pressure from the brake pipe to the atmosphere, and valve mechanism operated upon a sudden reduction in brake pipe pressure for supplying fluid under pressure from said emergency reservoir to the brake cylinder and for supplying fluid under pressure from the quick action reservoir to said quick action valve device and valve means, said valve means being operated, when the emergency reservoir pressure is increased to a predetermined degree beyond that normally carried, to a position for rendering said valve device ineffective to vary the rate of flow of fluid to the brake cylinder in effecting an application of the brakes, and means included in said valve means for venting fluid under pressure from said quick action valve device at a predetermined slow rate when the valve means is in the last mentioned position.

23. In a fluid pressure brake, the combination with a brake pipe, a brake cylinder, an emergency reservoir and a quick action reservoir, a valve device operative to vary the rate of flow of fluid under pressure to the brake cylinder in effecting an application of the brakes, valve means subject to the pressure of fluid from the emergency reservoir and adapted to be operated by fluid under pressure from said quick action reservoir to control the operation of said valve device, a quick action valve device adapted to be operated by fluid under pressure from said quick action reservoir for venting fluid under pressure from the brake pipe to the atmosphere, and valve mechanism operated upon a sudden reduction in brake pipe pressure for supplying fluid under pressure from said emergency reservoir to the brake cylinder and for supplying fluid under pressure from the quick action reservoir to said quick action valve device and valve means, said valve means being operated, when the emergency reservoir pressure is increased to a predetermined degree beyond that normally carried, to a position for rendering said valve device ineffective to vary the rate of flow of fluid to the brake cylinder in effecting an application of the brakes, and means included in said valve means for venting fluid under pressure from said quick action reservoir when the valve means is in the last mentioned position and said valve mechanism is in brake applying position.

24. In a fluid pressure brake, the combination with a brake pipe and a brake cylinder, of a triple valve device having a piston and valve means operated upon a gradual reduction in brake pipe pressure to make its full traverse for supplying fluid under pressure to the brake cylinder to effect a service application of the brakes, an emergency valve device operated only upon a sudden reduction in brake pipe pressure for supplying fluid to the brake cylinder at high pressure, valve mechanism for controlling the rapid supply of fluid under pressure from the triple valve device and emergency valve device to the brake cylinder and operated upon a predetermined increase in brake cylinder pressure for cutting off said rapid supply of fluid to the brake cylinder, and valve means operated upon the operation of said emergency valve device to emergency position for controlling the operation of said valve mechanism.

25. In a fluid pressure brake, the combination with a brake pipe and a brake cylinder, of a triple valve device having a piston and valve means operated upon a gradual reduction in brake pipe pressure to make its full traverse for supplying fluid under pressure to the brake cylinder to effect a service application of the brakes, an emergency valve device operated only upon a sudden reduction in brake pipe pressure for supplying fluid to the brake cylinder at high pressure, valve mechanism for controlling the rapid supply of fluid under pressure from the triple valve device and emergency valve device to the brake cylinder and operated upon a predetermined increase in brake cylinder pressure for cutting off said rapid supply of fluid to the brake cylinder and for retarding the rate of flow of fluid under pressure to the brake cylinder for a predetermined period of time, and means operated upon the operation of said emergency valve device to emergency position for controlling the operation of said valve mechanism.

26. In a fluid pressure brake, the combination with a brake pipe, a brake cylinder, and a reservoir normally charged with fluid under pressure, of a valve device operative to vary the rate of flow of fluid under pressure to the brake cylinder in effecting an application of the brakes, valve means subject on one side to the pressure of fluid from said reservoir and operative when subjected on the opposite side to a varying fluid pressure for controlling the operation of said valve device, valve mechanism operated upon a sudden reduction in brake pipe pressure for supplying fluid under pressure from said reservoir to the brake cylinder for effecting an application of the brakes and for supplying fluid under pressure to said opposite side of the valve means, and means for varying the pressure of fluid supplied to said opposite side of the valve means.

27. In a fluid pressure brake, the combination with a brake pipe and a brake cylinder, of a valve device operative to vary the rate of flow of fluid under pressure to the brake cylinder in effecting an application of the brakes, valve means constantly subject on one side to the pressure of fluid and operative when subjected on the opposite side to a varying fluid pressure for controlling the operation of said valve device, valve mechanism operated upon a reduction in brake pipe pressure for establishing communication through which fluid under pressure is supplied to the brake cylinder to effect an application of the brakes and for also establishing communication through which fluid under pressure is supplied to said opposite side of the valve means, and means for venting fluid under pressure from said opposite side of the valve means to the atmosphere.

28. In a fluid pressure brake, the combination with a brake pipe, a brake cylinder, and a reservoir normally charged with fluid under pressure, of a valve device operative to vary the rate of flow of fluid under pressure to the brake cylinder in effecting an application of the brakes, valve means subject on one side to the pressure of fluid from said reservoir and operative when subjected on the opposite side to a varying fluid pressure for controlling the operation of said valve device, valve mechanism operated upon a sudden reduction in brake pipe pressure for supplying fluid under pressure from said reservoir to the brake cylinder for effecting an application of the brakes and for supplying fluid under pressure to said opposite side of the valve means, and means for varying the pressure of fluid supplied to said opposite side of the valve means, said valve means being rendered ineffective to control the operation of said valve device upon the reservoir pressure being increased above that normally carried.

29. In a fluid pressure brake, the combination with a brake pipe and a brake cylinder, of a valve device operative to vary the rate of flow of fluid under pressure to the brake cylinder in effecting an application of the brakes, valve means constantly subject on one side to the pressure of fluid and operative when subjected on the opposite side to a varying fluid pressure for controlling the operation of said valve device, valve mechanism operated upon a reduction in brake pipe pressure for establishing communication through which fluid under pressure is supplied to the brake cylinder to effect an application of the brakes and for also establishing communication through which fluid under pressure is supplied to said opposite side of the valve means, and means for venting fluid under pressure from said opposite side of the valve means to the atmosphere, said valve means being rendered ineffective to control the operation of said valve device upon the pressure of fluid on the first mentioned side of the valve means being increased above the normal maximum pressure to which said side of the valve means is subjected.

30. In a fluid pressure brake, the combination with a brake pipe and a brake cylinder, of a valve device operative to vary the rate of flow of fluid under pressure to the brake cylinder in effecting an application of the brakes, valve means constantly subject on one side to the pressure of fluid and operative when subjected on the opposite side to a varying fluid pressure for controlling the operation of said valve device, valve mechanism operated upon a reduction in brake pipe pressure for establishing communication through which fluid under pressure is supplied to the brake cylinder to effect an application of the brakes and for also establishing communication through which fluid under pressure is supplied to said opposite side of the valve means, means for venting fluid under pressure from said opposite side of the valve means to the atmosphere, said valve means being rendered ineffective to control the operation of said valve device upon the pressure of fluid on the first mentioned side of the valve means being increased above the normal maximum pressure to which said side of the valve means is subjected, and means operative when the higher than normal pressure on the first mentioned side of the valve means is reduced to normal for again rendering said valve means effective to control the operation of said valve device.

31. In a fluid pressure brake, the combination with a brake cylinder and a normally charged emergency reservoir, of an inshot valve device for controlling a communication through which fluid under pressure is supplied to the brake cylinder in effecting both service and emergency applications of the brakes and operated upon a predetermined increase in brake cylinder pressure in effecting an emergency application for closing said communication, and means for supplying fluid under pressure from said reservoir to said inshot valve device for preventing the operation of the inshot valve device by an increase in brake cylinder pressure in effecting a service application of the brakes.

32. In a fluid pressure brake, in combination, a reservoir normally charged with fluid under pressure, a quick action chamber normally charged with fluid under pressure, a brake controlling valve device operative to supply fluid under pressure from said reservoir to the brake cylinder to effect an application of the brakes and to establish a communication through which fluid under pressure is vented from the quick action chamber, valve means operative to vary the rate of flow of fluid under pressure to the brake cylinder, and a valve device operated by fluid under pressure vented from the quick action chamber for controlling the operation of said valve means.

33. In a fluid pressure brake, in combination, a reservoir normally charged with fluid under pressure, a quick action chamber normally charged with fluid under pressure, a brake controlling valve device operative to supply fluid under pressure from said reservoir to the brake cylinder to effect an application of the brakes and to establish a communication through which fluid under pressure is vented from the quick action chamber, valve means operative to vary the rate of flow of fluid under pressure to the brake cylinder, and a valve device subject to the pressure of fluid from said reservoir and the opposing pressure of fluid vented from the quick action chamber for controlling the operation of said valve means.

34. In a fluid pressure brake, in combination, a reservoir normally charged with fluid under pressure, a quick action chamber normally charged with fluid under pressure, a brake controlling valve device operative to supply fluid under pressure from said reservoir to the brake cylinder to effect an application of the brakes and to establish a communication through which fluid under pressure is vented from the quick action chamber to the atmosphere at a slow rate, valve means operative to vary the rate of flow of fluid under pressure to the brake cylinder, and a valve device subject to the opposing pressures of the reservoir and quick action chamber for controlling the operation of said valve means.

35. In a fluid pressure brake, in combination, a brake cylinder, a reservoir normally charged with fluid at a certain pressure, means operative to supply fluid under pressure from said reservoir to the brake cylinder to effect an application of the brakes, valve means operative to vary the rate of flow of fluid to the brake cylinder, a valve device operative to control the operation of said valve means, and means subject to the pressure of fluid in said reservoir and operative when said reservoir is charged to a pressure in excess of said certain pressure for rendering said valve device inoperative to control the operation of said valve means.

36. In a fluid pressure brake, in combination, a reservoir normally charged with fluid under pressure, a quick action chamber normally charged with fluid under pressure, a brake controlling valve device operative to supply fluid under pressure from said reservoir to the brake cylinder to effect an application of the brakes and to establish a communication through which fluid under pressure is vented from the quick action chamber, valve means operative to vary the rate of flow of fluid under pressure to the brake cylinder, and a valve device operated by fluid under pressure vented from the quick action chamber for controlling the operation of said valve means, said valve device being rendered inoperative by fluid vented from the quick action chamber when said reservoir is charged to a pressure in excess of said certain pressure.

37. In a fluid pressure brake, in combination, a reservoir normally charged with fluid under pressure, a quick action chamber normally charged with fluid under pressure, a brake controlling valve device operative to supply fluid under pressure from said reservoir to the brake cylinder to effect an application of the brakes and to establish a communication through which fluid under pressure is vented from the quick action chamber, valve means operative to vary the rate of flow of fluid under pressure to the brake cylinder, and a valve device operated by fluid under pressure vented from the quick action chamber for controlling the operation of said valve means, said valve device being movable by fluid under pressure from said reservoir, when the pressure of fluid in said reservoir is in excess of that normally carried, to a position where it is inoperative to control the operation of said valve means.

38. In a fluid pressure brake, in combination, a reservoir normally charged with fluid under pressure, a quick action chamber normally charged with fluid under pressure, a brake controlling valve device operative to supply fluid under pressure from said reservoir to the brake cylinder to effect an application of the brakes and to establish a communication through which fluid under pressure is vented from the quick action chamber, valve means operative to vary the rate of flow of fluid under pressure to the brake cylinder, a valve device operated by fluid under pressure vented from the quick action chamber for controlling the operation of said valve means, said valve device being movable by fluid under pressure from said reservoir, when the pressure of fluid in said reservoir is in excess of that normally carried, to a position where it is inoperative to control the operation of said valve means, and means for maintaining said valve device in its operative or control position so long as the reservoir pressure does not exceed that normally carried.

39. In a fluid pressure brake, a reservoir normally charged with fluid at a certain pressure, a brake cylinder, means operative to supply fluid under pressure from said reservoir to the brake cylinder to effect an application of the brakes, valve means having a normally open valve past which fluid being supplied to the brake cylinder flows, said valve being operated in effecting an application of the brakes to first effect a retardation of the rate of flow of fluid to the brake cylinder and to then effect an increase in the rate of flow of fluid to the brake cylinder, and a control valve device operative to control the operation of said valve means and thereby said valve, said control valve device being adapted to be rendered ineffective to control the operation of said valve means when the reservoir pressure is in excess of said certain pressure.

40. In a fluid pressure brake apparatus adapted to be normally charged with fluid to a certain pressure for one class of train service and to a higher pressure for another class of train service, valve mechanism operative in either class of train service for supplying fluid under pressure to effect an application of the brakes, valve means for controlling the rate of flow of fluid supplied by said valve mechanism, and a valve device operative when the equipment is normally charged to a pressure not exceeding said certain pressure to effect the operation of said valve means to vary the rate of flow of fluid supplied by the valve mechanism, and when the equipment is charged to said higher pressure being conditioned to render the valve means ineffective to vary the rate of flow of fluid supplied by said valve mechanism.

ELLIS E. HEWITT.